United States Patent
Liu et al.

(10) Patent No.: US 11,044,671 B2
(45) Date of Patent: Jun. 22, 2021

(54) COMMUNICATION SYSTEM INCLUDING A WAKE-UP RADIO

(71) Applicant: Intel Corporation, Santa Clara, CA (US)

(72) Inventors: Renzhi Liu, Portland, OR (US); Asma Beevi Kuriparambil Thekkumpate, Santa Clara, CA (US); Brent Carlton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,953

(22) Filed: Mar. 29, 2019

(65) Prior Publication Data

US 2020/0314751 A1    Oct. 1, 2020

(51) Int. Cl.
*H04W 52/02* (2009.01)
*H04W 84/12* (2009.01)
*H04W 88/02* (2009.01)

(52) U.S. Cl.
CPC ........ *H04W 52/0229* (2013.01); *H04W 84/12* (2013.01); *H04W 88/02* (2013.01)

(58) Field of Classification Search
CPC .. H04W 52/0229; H04W 84/12; H04W 88/02
USPC ......................................................... 455/574
See application file for complete search history.

(56) References Cited

U.S. PATENT DOCUMENTS

| | | | | |
|---|---|---|---|---|
| 6,714,773 | B1* | 3/2004 | Ishida | H04B 1/406 455/272 |
| 8,494,027 | B2* | 7/2013 | Bulled | H04W 52/0229 375/132 |
| 8,680,947 | B1* | 3/2014 | Costa | H01P 1/213 333/101 |
| 9,477,292 | B1* | 10/2016 | Murali | G06F 1/3243 |
| 10,111,173 | B2* | 10/2018 | Alpman | H04W 52/0229 |
| 2004/0248614 | A1* | 12/2004 | Ella | H03H 9/542 455/552.1 |
| 2005/0085260 | A1* | 4/2005 | Ella | H04B 1/0057 455/552.1 |

(Continued)

OTHER PUBLICATIONS

C. Salazar, et al., "A 24 GHz Interferer-Resilient Wake-Up Receiver Using a Dual-IF Multi-Stage N-Path Architecture", IEEE JSSC, pp. 2091-2104, Sep. 2016.

(Continued)

*Primary Examiner* — Inder P Mehra
(74) *Attorney, Agent, or Firm* — Schiff Hardin LLP

(57) ABSTRACT

A communication device can include a receiver frontend and a wake-up receiver (WUR) frontend. The receiver frontend can have a radio frequency (RF) interface configured to couple to an antenna and a baseband interface configured to couple to a baseband component. The WUR frontend can be selectively coupled to the receiver frontend (e.g. between the RF interface and the baseband interface). The WUR frontend may monitor a communication channel and control the receiver frontend to adjust its operating mode (e.g. waking the receiver frontend from a sleep mode) based on the monitoring. The WUR frontend may have a lower power consumption than the receiver frontend. The WUR frontend and the receiver frontend may share the same impedance matching network and/or the RF interface.

24 Claims, 4 Drawing Sheets

(56) References Cited

U.S. PATENT DOCUMENTS

| | | | | |
|---|---|---|---|---|
| 2006/0189286 | A1* | 8/2006 | Kyu | H03F 3/19 455/144 |
| 2007/0205872 | A1* | 9/2007 | Kim | H04W 52/0229 340/10.33 |
| 2008/0108318 | A1* | 5/2008 | Min | H04W 52/0229 455/343.1 |
| 2008/0181155 | A1* | 7/2008 | Sherman | H04W 52/0229 370/311 |
| 2009/0213020 | A1* | 8/2009 | Rentz | H01Q 5/00 343/722 |
| 2013/0049839 | A1* | 2/2013 | Cheng | H04W 52/0229 327/306 |
| 2013/0285873 | A1* | 10/2013 | Dupuy | H01Q 21/30 343/852 |
| 2014/0126442 | A1* | 5/2014 | Jafarian | H04W 52/0212 370/311 |
| 2016/0080011 | A1* | 3/2016 | Sun | H04B 1/0475 455/114.2 |
| 2016/0241213 | A1* | 8/2016 | Zhao | H03G 3/3042 |
| 2016/0321480 | A1* | 11/2016 | Hamlin | G16H 10/40 |
| 2016/0374021 | A1* | 12/2016 | Alpman | H04W 52/0229 |
| 2017/0280392 | A1* | 9/2017 | Segev | H04W 52/0235 |
| 2018/0007629 | A1* | 1/2018 | Dorrance | H04W 52/0229 |
| 2018/0009416 | A1* | 1/2018 | Maiwand | G07C 9/00182 |
| 2018/0063788 | A1* | 3/2018 | Yang | H04W 12/00502 |
| 2019/0068247 | A1* | 2/2019 | Hueber | H04W 52/0235 |
| 2019/0089396 | A1* | 3/2019 | Kim | H03F 3/245 |
| 2019/0090191 | A1* | 3/2019 | Liu | H04L 5/0053 |
| 2019/0097672 | A1* | 3/2019 | Nosaka | H04B 1/44 |
| 2019/0132796 | A1* | 5/2019 | Huang | H04W 40/005 |
| 2019/0174413 | A1* | 6/2019 | Huang | H04W 52/0229 |
| 2019/0191375 | A1* | 6/2019 | Cheng | H04W 52/0229 |
| 2019/0223104 | A1* | 7/2019 | Huang | H04B 7/2621 |
| 2019/0243991 | A1* | 8/2019 | Mudulodu | G06F 9/4418 |
| 2019/0246351 | A1* | 8/2019 | Yang | H04W 52/0216 |
| 2019/0320389 | A1* | 10/2019 | Alanen | H04L 5/0064 |
| 2019/0364503 | A1* | 11/2019 | Kasslin | H04W 52/0235 |
| 2020/0288395 | A1* | 9/2020 | Doherty | H04W 52/028 |
| 2020/0314751 | A1* | 10/2020 | Liu | H04W 52/0229 |

OTHER PUBLICATIONS

H. Seok, et al., "A 2.4GHz, −102dBm-Sensitivity, 25kb/s, 0.466mW Interference Resistant BFSK Multi-Channel Sliding-IF ULP Receiver", VLSI Circuits 2017, pp. C70-C71.

J. Im, et al., "A 470μW-92.5dBm OOK/FSK Receiver for IEEE 802.11 Wi-Fi LP-WUR", ESSCIRC 2018, pp. 302-305.

E. Alpman, et al., "95μW 802.11g/n compliant fully-integrated wake-up receiver with −72dBm sensitivity in 14nm FinFET CMOS", RFIC 2017, pp. 172-175.

* cited by examiner

COMMUNICATION SYSTEM INCLUDING A WAKE-UP RADIO

BACKGROUND

Field

Aspects described herein generally relate to communication systems and protocols implementing a wake-up radio (WUR).

Related Art

Wireless communication devices have a fundamental trade-off between low-power and low-latency operations, which limits the realization of systems that are both lower-powered and continuously connected/active. Attempts to reduce the trade-off implications have required additional radio frequency (RF) ports and/or additional external radios.

Power consumption limits wireless systems, particularly with mobile devices which are battery powered Enhancing battery life of these wireless systems is also a challenge because as performance of wireless systems improves, there is generally more burden on battery usage.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
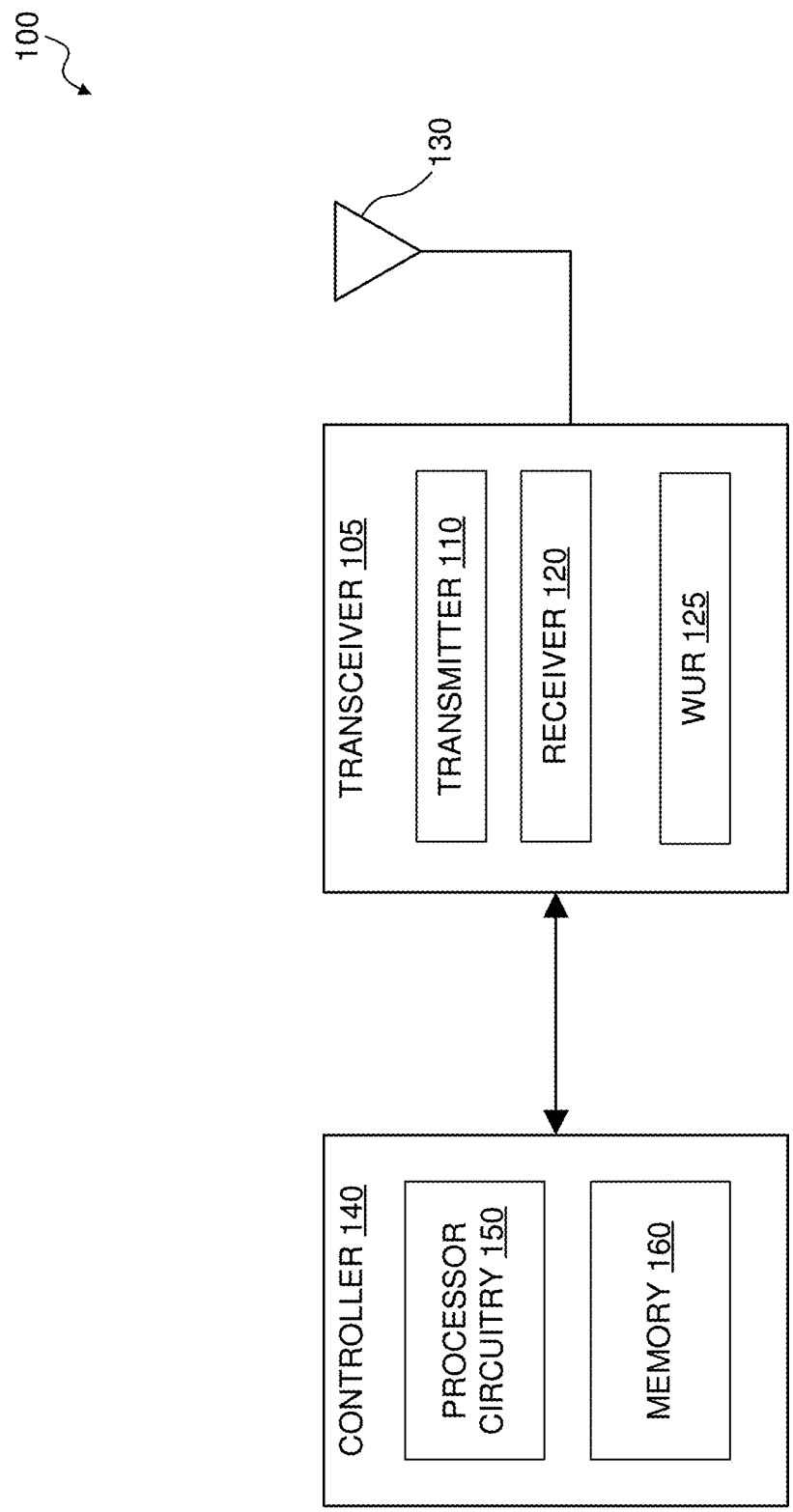
FIG. 1 illustrates a block diagram of a communication device according to exemplary aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Aspects of the present disclosure relate to wireless local area networks (WLANs) and Wi-Fi networks including networks operating in accordance with the Institute of Electrical and Electronics Engineers (IEEE) 802.11 family of standards, such as the IEEE 802.11ac, IEEE 802.11ad and IEEE 802.11ay standards, the IEEE 802.11ax study group (SG) (named DensiFi) and Wireless Gigabit Alliance (Wi-Gig). Although the present disclosure is discussed with respect to WLAN/Wi-Fi communication protocols, the present disclosure is also applicable to other communication protocols, including, for example, mobile wireless communications such as the Fourth Generation (4G) and Fifth Generation (5G) cellular communication standards.

Wireless communication devices, including devices utilizing communications conforming to the IEEE 802.11 standards, balance low-power and low-latency operations due to the unscheduled nature of Wi-Fi communications. To save power, the main wireless radio may be power cycled, where the main radio is the receiver in the wireless system that receives incoming RF (radio frequency) data. The main radio is generally one of the high power consuming circuits of a wireless system, and a way to reduce power of a wireless system is to reduce energy consumption of the main radio. However, low energy consumption and low latency are two conflicting goals in duty-cycled wireless systems. Aggressive power saving is possible by keeping the main radio in the sleep mode (low-power mode) for a long period of time but it creates more latency in the communication or the communication can be lost completely.

Aspects of the present disclosure include a wake-up radio (WUR) receiver configured to monitor one or more wireless channels while having a reduced power consumption as compared to the main wireless radio receiver (e.g. Wi-Fi/wireless local area (WLAN) radio). The WUR reduces the frequency in which the WLAN radio is active and operating in a full-power mode, where the WLAN radio is active (e.g. operating in a full-power operating mode) only upon receiving a wake-up message via the WUR. This advantageously achieves both a power consumption reduction and low latency performance. In an exemplary aspect, the WUR is an always-on, always-listening, and lower-powered device that is configured to sense/detect a "wake-up" signal/message and turn the main (e.g. Wi-Fi) radio on when needed. Advantageously, a power efficient scheme is realized as the main radio can be kept in a sleep mode (e.g. lower-power mode) until the lower-powered WUR "wakes up" (e.g. controls the main radio to operate in the normal mode) the main radio. In an exemplary aspect, the WUR is not "always on" and can be duty-cycled or otherwise selectively powered on/off to further reduce power consumption of the WUR and the communication device.

In one or more aspects of the disclosure, the WUR and wireless system are compliant with the IEEE 802.11 Wi-Fi standard (or any other wireless standard), including the IEEE 802.11ba standard directed to power management, but the disclosure is not limited thereto.

Aspects provide a communication device including an integrated WUR (e.g. a WLAN radio and WUR integrated in a single chip) that maintains input/output performance while avoiding additional radio frequency (RF) ports and reducing impacts on performance of the WLAN main radio when the WUR is inactive.

FIG. 1 illustrates a simplified block diagram of a communication device 100 according to an exemplary aspect of the present disclosure. The communication device 100 includes a controller 140 communicatively coupled to one or more transceivers 105. The transceiver(s) 105 is configured to transmit and/or receive wireless communications via one or more wireless technologies. In an exemplary aspect, the transceiver 105 includes processor circuitry that is configured for transmitting and/or receiving wireless communications conforming to one or more wireless protocols.

The communication device 100 is configured to communicate with one or more other communication devices, including, for example, one or more base stations, one or more access points, one or more mobile communication devices, and/or one or more other devices as would be understood by one of ordinary skill in the relevant arts.

In an exemplary aspect, the communication device 100 is configured to transmit and/or receive wireless communications based on one or more wireless technologies. For example, the communication device 100 can be configured for wireless communications conforming to, for example, one or more WLAN (e.g. IEEE 802.11) protocols. The communication device 200 is not limited to these communication protocols and can be configured for one or more additional or alternative communication protocols, such as one or more fifth generation (5G) cellular communication protocols, fourth generation (4G) cellular communication protocols (e.g. 3rd Generation Partnership Project's (3GPP) protocols, such as Long-Term Evolution (LTE)), and/or one or more other communication protocols (e.g. Bluetooth, near-field communication, etc.) as would be understood by one of ordinary skill in the relevant arts. Although illustrated as including only transceiver 105, the communication device 100 may include one or more additional transceivers configured to communicate via the same communication protocol(s) as transceiver 105 and/or one or more additional and/or alternative communication protocols (e.g. LTE, 5G, etc.).

In an exemplary aspect, the communication device 100 is configured to transmit and/or receive wireless communications using one or more IEEE 802.11 communication protocols, and conform to the power management and battery life improvements provided in IEEE 802.11ba. In an exemplary aspect, the communication device 100 is configured for Multiple-input Multiple-output (MIMO) communications. In a MIMO operation, the communication device 100 may be configured to use multiple transmitting radio frequency (RF) chains and/or multiple receiving RF chains for wireless communications, thereby increasing the capacity of the radio link.

In an exemplary aspect, the transceiver 105 includes a transmitter 110 and a receiver 120 configured for transmitting and receiving wireless communications, respectively, via one or more antennas 130. The communication device 100 can include one or more additional transceivers configured for one or more additional communication protocols. In aspects having two or more transceivers, the two or more transceivers can have their own antenna 130, or can share a common antenna via a duplexer or other isolator.

In an exemplary aspect, the transceiver 105 is configured to perform one or more radio frequency (RF) processing functions and/or baseband processing functions, such as media access control (MAC), encoding/decoding, filtering, modulation/demodulation (e.g. phase and/or amplitude modulation/demodulation), data symbol mapping, and/or error correction. In an exemplary aspect, the transceiver 105 includes processor circuitry configured to perform one or more of the above functions (and/or one or additional or alternative functions described herein associated with processing communication information/data).

The antenna 130 can include one or more antenna elements forming an integer array of antenna elements. In an exemplary aspect, the antenna 130 is a phased array antenna that includes multiple radiating elements (antenna elements) each having a corresponding phase shifter. The antenna 130 configured as a phased array antenna can be configured to perform one or more beamforming operations that include generating beams formed by shifting the phase of the signal emitted from each radiating element to provide constructive/destructive interference so as to steer the beams in the desired direction. In an exemplary embodiment, two or more of the antenna elements of the antenna array are configured for wireless communication utilizing a MIMO configuration, and/or the communication device includes two or more antennas 130 configured for MIMO communications.

In an exemplary aspect, the controller 140 includes processor circuitry 150 that is configured to control the overall operation of the communication device 100, such as the operation of the transceiver(s) 105. The processor circuitry 150 can be configured to control the transmitting and/or receiving of wireless communications via the transceiver(s) 105.

In an exemplary aspect, the processor circuitry 150 is configured to perform, alternatively or in cooperation with the transceiver 105, one or more radio frequency (RF) processing functions and/or baseband processing functions, such as media access control (MAC), encoding/decoding, filtering, modulation/demodulation (e.g. phase and/or amplitude modulation/demodulation), data symbol mapping, and/or error correction.

The processor circuitry 150 can be configured to run one or more applications and/or operating systems; power management (e.g., battery control and monitoring); display settings; volume control; and/or user interactions via one or more user interfaces (e.g., keyboard, touchscreen display, microphone, speaker, etc.).

The controller 140 can further include a memory 160 that stores data and/or instructions, where when the instructions are executed by the processor circuitry 150, controls the processor circuitry 150 to perform the functions described herein.

The memory 160 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable or removable, or a combination of both.

Examples of the communication device 100 include (but are not limited to) a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 200 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal.

In one or more aspects, the communication device 100 (or one or more components of the communication device 100) can be additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), encoding/decoding (e.g., using encoders/decoders having, for example, convolution, tail-biting convolution, turbo, Viterbi, and/or Low Density Parity Check (LDPC) encoder/decoder functionality), frequency conversion (using, for example, mixers, local oscillators, and filters), Fast-Fourier Transforms (FFT), preceding, and/or constellation mapping/de-mapping to transmit and/or receive wireless communications conforming to one or more wireless protocols, and/or facilitate beamforming scanning operations and/or beamforming communication operations.

In an exemplary aspect, the transceiver 105 further includes a wake-up radio (WUR) 125. In this example, the transmitter 110 and receiver 120 can be referred to as the "main" radio.

In an exemplary aspect, the WUR 125 is a receiver that has a lower power consumption as compared to the receiver 120, and is configured to monitor one or more communication (e.g. wireless) channels. Advantageously, the WUR 125 reduces the frequency in which the receiver 120 is active because the receiver 120 operates in a sleep (e.g. low-power) mode until woken up by the WUR 125. In an exemplary aspect, the WUR 125 is configured to monitor the channel for a wake-up message (or signal) received via the communication channel, and provide the wake-up message to the receiver 120 to control the receiver 120 to wake-up: operate in an active operational mode (e.g. operating in a full-power operating mode). Alternatively or additionally, the WUR 125 can provide the wake-up message to the controller 140 and the controller 140 can control the receiver 120 to wake-up.

In an exemplary aspect, the receiver 120 is limited to operating in the active operating mode such that the receiver 120 only operates in the active operating mode upon receiving the wake-up message. Advantageously, the WUR 125 allows the communication device 100 to have a reduced power consumption as compared to conventional devices while also achieving a low latency operation. In an exemplary aspect, the WUR 125 (and the communication device 100) is configured to operating in accordance with the IEEE 802.11ba standard.

Figure 2:
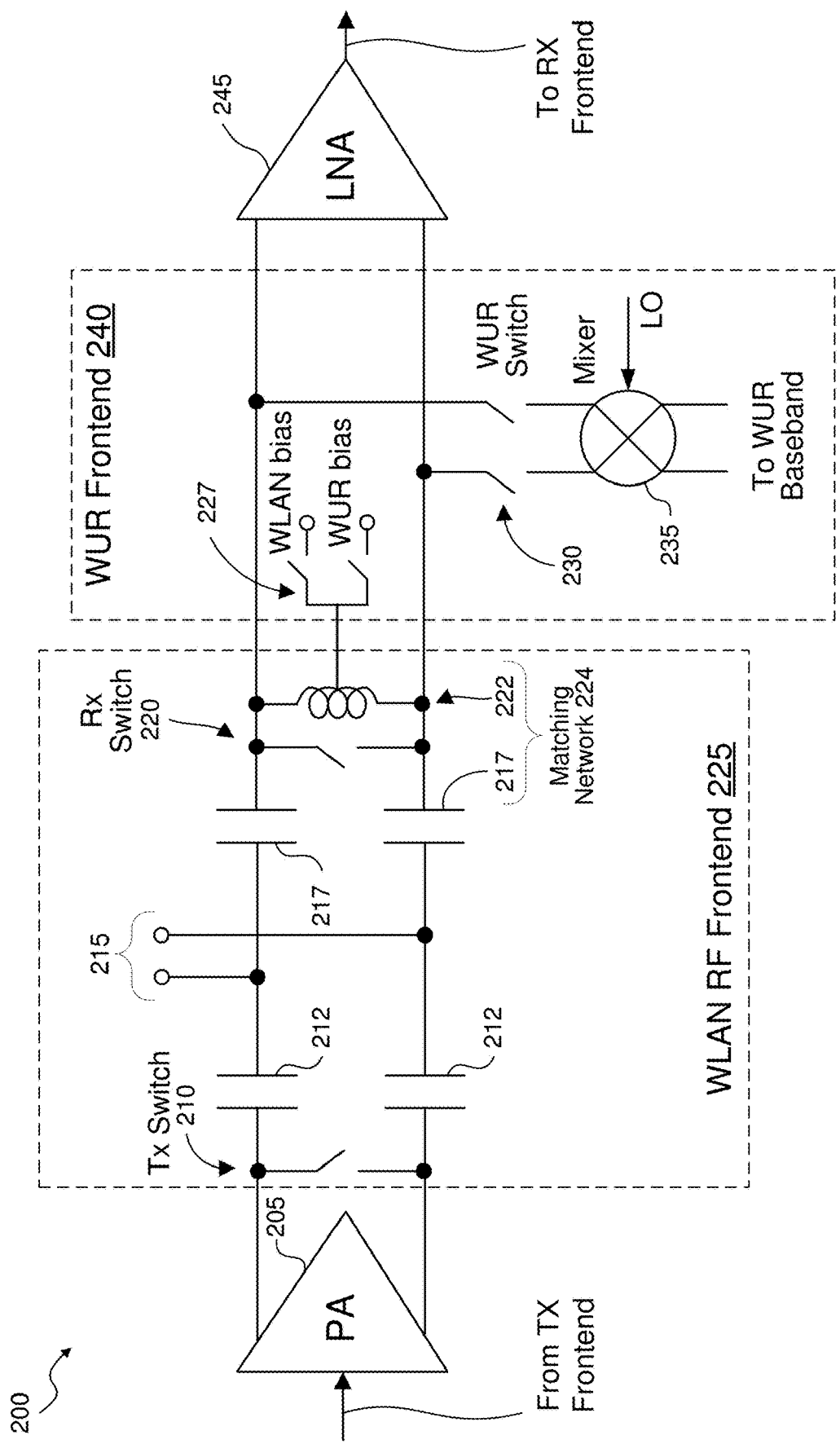
FIG. 2 illustrates a wireless frontend system according to exemplary aspects of the present disclosure.

FIG. 2 illustrates a wake-up receiver (WUR) system 200 according to an exemplary aspect of the present disclosure.

In an exemplary aspect, the WUR system 200 includes a WLAN (e.g. Wi-Fi) RF frontend 225 that is coupled (e.g. selectively coupled) to a WUR frontend 240. In an exemplary aspect, the WUR system 200 is implemented in transceiver 105 of the communication device 100 of FIG. 1. For example, the WUR frontend 240 is an aspect of the WUR 125, and the WLAN RF frontend 225 is an aspect of the transmitter 110 and/or receiver 120.

The WUR system 200 is coupled to a transmitter frontend (e.g. of transmitter 110) via power amplifier (PA) 205 and to a receiver frontend (e.g. of receiver 120) via low-noise amplifier (LNA) 245. In this configuration, the output of the PA 205 is coupled to the WLAN RF frontend 225, which is coupled to the LNA 245. In an exemplary aspect, the connection/coupling between the PA 205 and LNA 245 includes two parallel connections/coupling paths.

In an exemplary aspect, the WLAN RF frontend 225 includes transmitter switch 210 and receiver switch 220, and a matching network 224 (e.g. impedance matching network). On the transmitter side, the WLAN RF frontend 225 includes AC coupling capacitors 212 and the transmitter switch 210 configured as a shunt transmitter switch (e.g. connected across the parallel path). On the receiver side, the WLAN RF frontend 225 includes receiver switch 220, AC coupling capacitors 217 and a shunt inductor 222. In an exemplary aspect, the receiver switch 220 is configured as a shunt switch that extends across the parallel paths and is connected in parallel with the shunt inductor 222. In an exemplary aspect, the matching network 224 (e.g. impedance matching network) includes one or more inductors, capacitors, and/or resistors. In an exemplary aspect, the matching network 224 additionally or alternatively includes one or more transformers.

In an exemplary aspect, the AC coupling capacitors 217 and a shunt inductor 222 collectively form an impedance matching network 224. In another aspect, the impedance matching network 224 is solely defined by the inductor 222. In an exemplary aspect, the impedance matching network 224 is configured to function as a step-up matching network to provided passive voltage gain for the LNA 245. Advantageously, the impedance matching network 224 improves the overall noise figure (NF) performance of the WLAN receiver frontend (e.g. of receiver 120). In an exemplary aspect, the receiver switch 220 is configured as a shunt switch.

In an exemplary aspect, the matching network 224 is configured to provide, for example, 50 ohm matching when the communication device 100 is operating in the WUR operation mode (e.g. when the WUR frontend 240 is coupled to the matching network 224, LNS 245, and RF interface 215). Advantageously, the sharing of the matching network 224 between the WLAN RF frontend 225 and the WUR frontend 240 reduces overhead cost of the WUR frontend 240 and the integration within the communication device 100. In the WUR operation mode, the WUR switch 230 is closed (ON) and the load on the inputs to the LNA 245 from the WUR frontend 240 is predominately a resistive load from the WUR mixer 235. This load is a high impedance as compared to the output impedance of the matching network 224. Therefore, the loading from the WUR frontend 240 does not alter the matching network 224. Advantageously, the silicon to off-chip interface will maintain as 50 ohm matched in the WUR mode.

As a further advantage, the matching network 224 as a step-up matching network for the receiver of the WLAN RF frontend 225 provides voltage gain for LNA 245 when the communication device 100 is operating in both the receive mode and the WUR mode (see Table 1). The passive voltage gain significantly improves the system's overall noise figure (NF) performance (See FIGS. 3-4). This improvement is increasingly realized for a low-power WUR 125 configuration that may have a relatively high NF. The inventors have identified that without the step-up matching network 224, the NF of the WUR frontend 240 can be, for example, 16 dB, and improves to, for example, 13 dB with the addition of the matching network 224. Advantageously, this improvement in the NF is equivalent to, for example, a doubling of the reduction in the power consumption for the WUR frontend 240 according to exemplary aspects so as to realize an ultra-low-power WUR receiver 125.

In an exemplary aspect, an RF interface (e.g. RF port(s)) 215 is provided between the transmitter side (switch 210 and capacitors 212) and the receiver side (switch 220, capacitors 217, and inductor 222). The RF interface 215 is configured to couple to one or more antennas, such as antenna 130.

In an exemplary aspect, the WUR frontend 240 is a mixer-first Wake-up Receiver, and incldues a mixer 235 that is coupled to the WLAN RF frontend 225. In an exemplary aspect, the mixer 235 is configured to mix a RF signal received by the WUR system 200 via the RF interface 215 (e.g. via an antenna connected to the RF interface 215) with a local oscillator (LO) signal provided to the mixer 235 by a local oscillator (not shown). In an exemplary aspect, the mixer 235 is configured to mix the RF signal with the LO signal to down convert the RF signal to a WUR baseband signal. The WUR baseband signal can then be provided to a WUR baseband component (e.g. baseband processor) of the communication device 100. In an exemplary aspect, the WUR frontend 240 is configured to provide the WUR baseband message/signal (which may include a wake-up message (or signal)) to another component of the communication device 100 (e.g. controller 140). The controller 140 is then configured to detect the presence of the wake-up message/signal within the WUR baseband message/signal and control the operation of the WUR system 200 based on whether the wake-up message/signal is detected.

In an exemplary aspect, the WUR frontend 240 is coupled to the WLAN RF frontend 225 (e.g. to the parallel paths between the PA 205 and LNA 245) such that the WUR frontend 240 is coupled between the LNA 245 and the matching network 224 of the WLAN RF frontend 224. In an exemplary aspect, the WUR frontend 240 is selectively coupled to the WLAN RF frontend 225 via the WUR switch 230.

In an exemplary aspect, the WUR frontend 225 is configured to monitor the communication channel via the RF interface 215, and/or the communication device 100 (e.g. controller 140) is configured to monitor the communication channel using the WUR frontend 225, to detect the presence of the wake-up message/signal within a RF signal received via the communication channel. For example, the controller 140 can analyze a received message/signal to determine the presence of the wake-up message/signal, and to control the operation of the receiver 120 (e.g. WLAN RF frontend 225) and the WUR 125 (e.g. WUR frontend 240) based on the determination.

In an exemplary aspect, the communication device 100 (e.g. WUR system 200) is configured to selectively operate in a WLAN transmission mode, a WLAN receiving mode, and a WUR mode. In the WLAN transmission mode, the WUR system 200 is configured to couple the transmission frontend to the RF interface 215 to transmit a message/signal from the communication device 100 (e.g. via antenna 130 coupled to the interface 215). In the WLAN receiving mode, the WUR system 200 is configured to couple the receiver frontend to the RF interface 215 to receive a message/signal by the communication device 100 (e.g. via antenna 130 coupled to the interface 215). In the WUR mode, the WUR frontend 240 is coupled to the communication channel (e.g. via antenna 130 coupled to the interface 215) and the WUR frontend 240 is configured to monitor the communication channel for a wake-up message/signal. While in the WUR mode, the receiver frontend (e.g. receiver 120) enters a sleep mode (e.g. reduced power mode) so that the receiver frontend (e.g. receiver 120) consumes less power as an active (e.g. normal power) mode when the receiver frontend is coupled to the RF interface 215.

In an exemplary aspect, the WUR frontend 240 further includes a bias switch 227 that is configured to selectively couple the inductor 222 to one or more biasing voltages. In an exemplary aspect, the inductor 222 includes a center tap, and the center tap is coupled to the biasing voltage(s) via the bias switch 227. In an exemplary aspect, the bias switch 227 is configured to selectively couple the inductor 222 to a WLAN mode bias voltage or a WUR mode bias voltage.

In an exemplary aspect, the WUR mode bias voltage is ground, and during the WUR mode, the bias switch 227 is configured to selectively couple the inductor 222 (e.g. center tap of inductor 222) to the ground to generate a zero volt DC biasing for the mixer 235. The WUR mode bias voltage is not limited to ground, and can be another voltage as would be understood by one of ordinary skill in the art.

In this example, by setting the DC voltage to 0V (e.g. ground), the LO does not require AC coupling for driving the WUR mixer 235. This advantageously reduces the power needed significantly for the LO (e.g. >50% according to aspects herein), which reduces the overall power of the WUR receiver 125 (e.g. LO driver power consumption may account for >20% of overall receiver power consumption). Advantageously, unlike biasing through a resistor, by using the inductor 222 for DC biasing, DC current flow into the biasing node without changing the DC biasing voltage avoids (or reduces) additional noise. As a further advantage, because the WUR frontend 240 and the WLAN RF frontend 225 share the same inductor 222, the requirement for an additional inductor is avoided.

In an exemplary aspect, the transmitter switch 210, receiver switch 220, the WUR switch 230, and bias switch 227 are controlled to selectively turn ON/OFF to adjust the operating mode of the WUR system 200. The selective operation of the switches can be based on the presence of the wake-up message/signal in the RF message/signal received via the RF interface 215. In an exemplary aspect, the operation of the transmitter switch 210, receiver switch 220, WUR switch 230, and bias switch 227 are as provided in Table 1.

TABLE 1

Operation Mode Switch Configurations

| | WLAN Tx mode | WLAN Rx mode | WUR mode |
| --- | --- | --- | --- |
| Tx switch 210 | Off (open) | On (closed) | On (closed) |
| Rx switch 220 | On (closed) | Off (open) | Off (open) |
| WUR switch 230 | Off (open) | Off (open) | On (closed) |
| Inductor Center tap switch | N/A | Wi-Fi bias | WUR bias |

In an exemplary aspect, communication device 100 operates in a reduced power mode (e.g. WUR mode) where the receiver 120 is in a sleep (e.g. reduced power) mode and the WUR 125 monitors the communication channel (e.g. via interface 215 and antenna 130). In the WUR mode: (1) the transmitter switch 210 is closed (ON) so as to shunt the coupling capacitors 212 on the transmitter side of the WUR system 200; (2) the receiver switch 220 is open (OFF); (3) the WUR switch 230 is closed (ON) so as to couple the WUR frontend to the RF interface 215, matching network 224 and LNA 245; and (4) the bias switch 227 is connected to the WUR mode bias voltage (e.g. ground).

Based on the monitoring of the channel by the WUR 125, the communication device 100 can switch from the WUR mode to the receiving mode. In an exemplary aspect, the WUR 125 is configured to detect a wake-up message (or signal) and provide the wake-up message to the receiver 120 to control the receiver 120 to wake-up: operate in an active operational mode (e.g. operating in a full-power operating mode). Alternatively or additionally, the WUR 125 can provide the wake-up message to the controller 140 and the controller 140 can control the receiver 120 to wake-up. When operating in the receiving mode: (1) the transmitter switch 210 is closed (ON) so as to shunt the coupling capacitors 212 on the transmitter side of the WUR system 200; (2) the receiver switch 220 is open (OFF) to couple the LNA 245 to the RF interface 215; (3) the WUR switch 230 is open (OFF) to decouple the WUR frontend from the RF interface 215, matching network 224 and LNA 245; and (4) the bias switch 227 is connected to the WLAN mode bias voltage.

To transmit, the communication device 100 can operate in the transmission mode where: (1) the transmitter switch 210 is open (OFF) to couple the PA 205 to the RF interface 215; (2) the receiver switch 220 is closed (ON) so as to shunt the coupling capacitors 217 on the receiver side of the WUR system 200; (3) the WUR switch 230 is open (OFF) to decouple the WUR frontend from the RF interface 215, matching network 224 and LNA 245; and (4) the bias switch 227 is not connected to the WLAN mode bias voltage or the WUR mode bias voltage. In an exemplary aspect, the operation of the bias switch 227 can be disregarded because the matching network is not coupled to the RF interface 215 based on the receive switch being closed (ON), thereby shunting the matching network 224.

Figure 3:
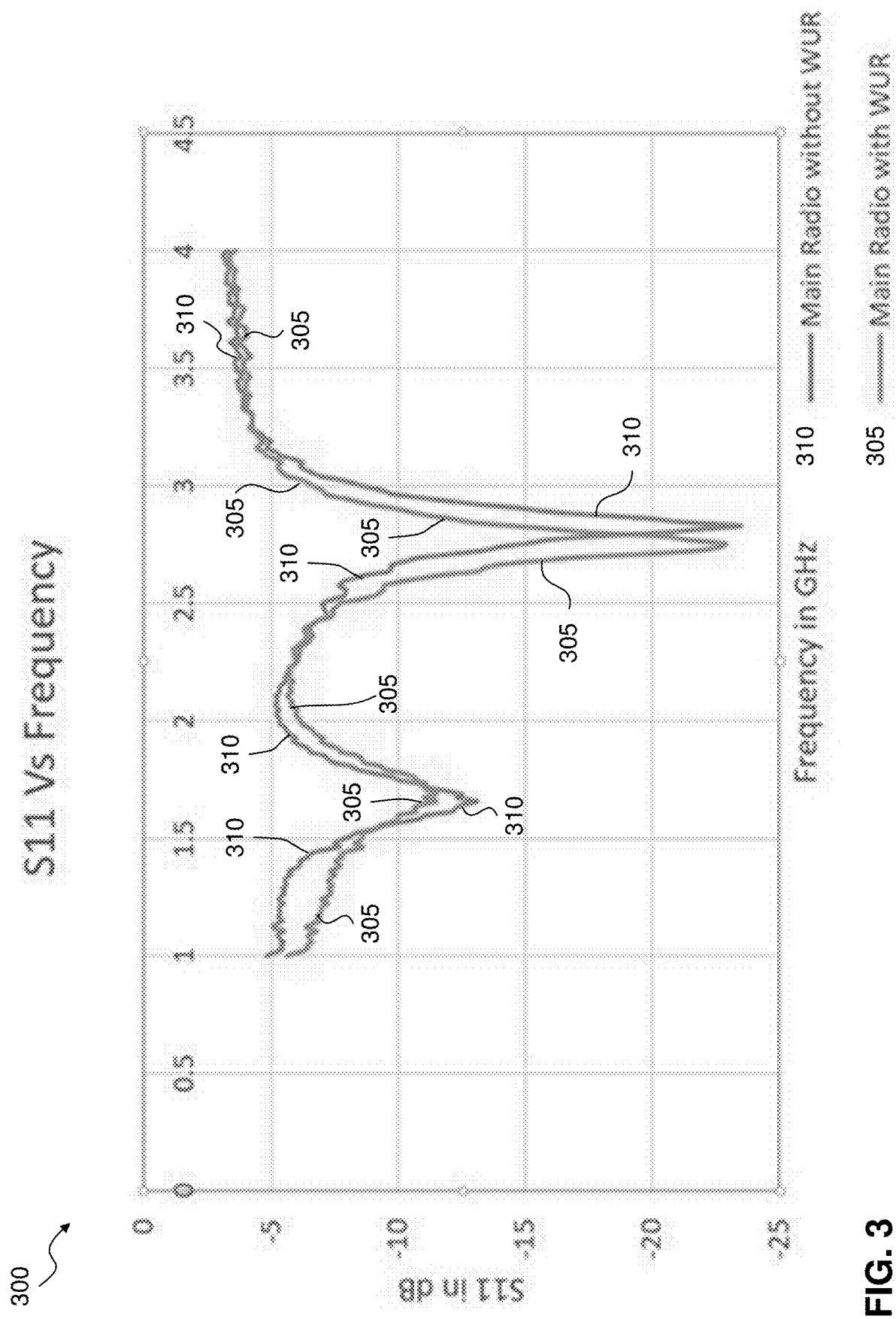
FIG. 3 illustrates a plot of reflection coefficient measurements (S11) according to exemplary aspects of the present disclosure.

Advantageously, the configuration and selective coupling of the WUR frontend 240 to the WLAN RF frontend 225 according to exemplary aspects of the present disclosure avoids or significantly limits impacts on the performance of the communication device 100. In particular, because the WUR frontend 240 can be decoupled from the LNA 245 when the communication device 100 is operating in the transmitting or receiving mode via the transmitter 110/ receiver 120, the WLAN radio performance is not impacted. The maintained performance is illustrated in FIG. 3, which shows S11 off-chip matching measurements versus frequency for configurations with (plot 305) and without (plot 310) the integration of the WUR 125. Exemplary gain and NF measurements are provided in Table 2 below.

TABLE 2

Gain and NF performance of Wi-Fi Rx

|  | WLAN Rx | WLAN Rx + WUR |
|---|---|---|
| Gain (dB) | 43.4 | 43 |
| NF (dB) | 5.6 | 5.3 |

Figure 4:
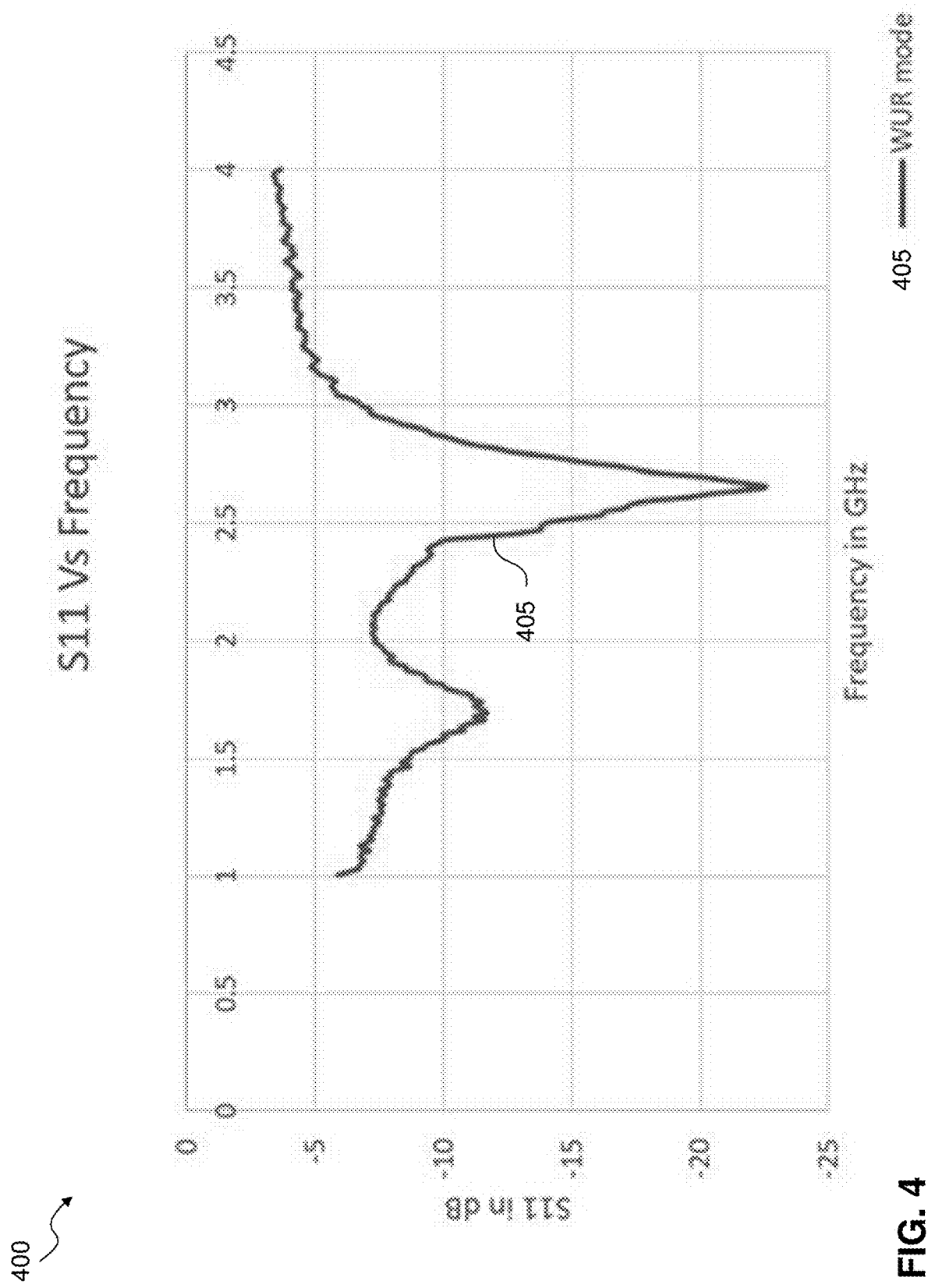
FIG. 4 illustrates a plot of reflection coefficient measurements (S11) according to exemplary aspects of the present disclosure.

FIG. 4 illustrates the S11 matching measurement of the WUR mode according to exemplary aspects. Plot 405 shows the S11 matching measurement of the WUR mode. As is illustrated, the WUR receiver 125 is well matched to, for example 50 ohm, as the measured S11 is lower than −10 dB from 2.4 GHz to 2.5 GHz, which is an exemplary operating band for the WUR receiver 125. The communication device 100 also exhibits good NF performance of the WUR receiver 125 as illustrated by the low noise operation.

EXAMPLES

Example 1 is a communication device, comprising: a receiver frontend having a radio frequency (RF) interface configured to couple to an antenna and a baseband interface configured to couple to a baseband component; and a wake-up receiver (WUR) frontend selectively coupled to the receiver frontend to selectively couple the WUR frontend to the RF interface and the baseband interface.

Example 2 is the subject matter of Example 1, wherein the WUR frontend is configured to monitor a communication channel and control the receiver frontend to adjust its operating mode based on the monitoring of the communication channel.

Example 3 is the subject matter of Example 2, wherein adjusting the operating mode of the receiver fronted includes waking the receiver frontend from a sleep mode.

Example 4 is the subject matter of any of Examples 1-3, wherein the WUR frontend has a lower power consumption than the receiver frontend.

Example 5 is the subject matter of any of Examples 1-4, wherein the WUR frontend and the receiver frontend share a same impedance matching network.

Example 6 is the subject matter of Example 5, wherein the impedance matching network is selectively coupled to a biasing voltage based on an operating mode of the receiver frontend.

Example 7 is the subject matter of any of Examples 1-6, wherein the WUR frontend is configured to share the RF interface with the receiver frontend.

Example 8 is the subject matter of any of Examples 1-7, wherein the WUR frontend is selectively coupled to the receiver frontend between the RF interface and the baseband interface.

Example 9 is the subject matter of any of Examples 1-8, wherein the receiver frontend further comprises an impedance matching network and an amplifier whose output is coupled to the baseband interface, the WUR frontend being coupled to the receiver frontend between the impedance matching network and the amplifier.

Example 10 is the subject matter of any of Examples 1-9, further comprising a WUR switch that is configured to selectively couple the WUR frontend to the receiver frontend.

Example 11 is the subject matter of any of Examples 1-10, further comprising a receiver shunt switch that is configured to selectively shunt an impedance matching network shared by the WUR frontend and the receiver frontend.

Example 12 is the subject matter of any of Examples 1-11, further comprising: a WUR switch that is configured to selectively couple the WUR frontend to the receiver frontend; and a receiver shunt switch that is configured to selectively shunt an impedance matching network shared by the WUR frontend and the receiver frontend.

Example 13 is the subject matter of Example 12, wherein the WUR switch and the receiver shunt switch are selectively opened/closed based on an operating mode of the receiver frontend.

Example 14 is a communication device, comprising: a receiver frontend including a radio frequency (RF) interface and an impedance matching network; and a wake-up receiver (WUR) frontend selectively coupled to the receiver frontend such that the WUR frontend and the receiver frontend are configured to share the impedance matching network.

Example 15 is the subject matter of Example 14, wherein the receiver frontend further comprises an amplifier whose input is coupled to the impedance matching network and the RF interface, and selectively coupled to the WUR frontend.

Example 16 is the subject matter of any of Examples 14-15, wherein the WUR frontend is configured to monitor a communication channel and control the receiver frontend to wake from a sleep mode based on the monitoring of the communication channel.

Example 17 is the subject matter of any of Examples 14-16, wherein the impedance matching network is selectively coupled to a biasing voltage based on an operating mode of the receiver frontend.

Example 18 is the subject matter of any of Examples 14-17, wherein the WUR frontend is configured to share the RF interface with the receiver frontend.

Example 19 is the subject matter of any of Examples 14-18, further comprising: a WUR switch that is configured to selectively couple the WUR frontend to the receiver frontend; and a receiver shunt switch that is configured to selectively shunt the impedance matching network shared by the WUR frontend and the receiver frontend.

Example 20 is the subject matter of any of Examples 14-19, wherein the WUR switch and the receiver shunt switch are selectively opened/closed based on an operating mode of the receiver frontend.

Example 21 is a communication device, comprising: a coupler configured to selectively couple a receiver frontend to an impedance matching network and a radio frequency (RF) interface of the communication device; and a wake-up receiver (WUR) frontend configured to: selectively couple to the RF interface and the impedance matching network; monitor a communication channel via the RF interface; and selectively couple the receiver frontend to the RF interface and the impedance matching network based on the monitoring of the communication channel.

Example 22 is the subject matter of Example 21, wherein the receiver frontend is configured to selectively enter a sleep mode when the receiver fronted is decoupled from the impedance matching network and the RF interface.

Example 23 is the subject matter of any of Examples 21-22, wherein the impedance matching network is selectively coupled to a biasing voltage based on the selectively coupling of the receiver frontend and the WUR frontend to the impedance matching network.

Example 24 is the subject matter of any of Examples 21-23, wherein the receiver frontend further comprises an amplifier whose input is coupled to the RF interface and the impedance matching network, wherein the WUR frontend is further coupled to the input of the amplifier when the WUR frontend is coupled to the RF interface and the impedance matching network.

Example 25 is the subject matter of any of Examples 21-24, wherein, based on the selectively coupling of the receiver frontend and the WUR frontend to the impedance matching network an: the WUR frontend further comprises a WUR switch that is configured to selectively couple the WUR frontend to the RF interface and the impedance matching network; and the coupler further comprises a shunt switch that is configured to selectively shunt the impedance matching network.

Example 26 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry may include memory that stores data and/or instructions. The memory may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to communication protocols that utilize the IEEE 802.11ba standard. The exemplary aspects can be applied to other wireless communication protocols/standards (e.g., Long-Term Evolution (LTE), Fifth Generation (5G) protocols, or other cellular protocols, other IEEE 802.11 protocols, etc.) as would be understood by one of ordinary skill in the relevant arts.

The invention claimed is:

1. A communication device, comprising:
   a receiver frontend including a radio frequency (RF) interface configured to couple to an antenna, a baseband interface configured to couple to a baseband component, and an impedance matching network; and
   a wake-up receiver (WUR) frontend selectively coupled to the receiver frontend, between the impedance matching network and the baseband interface, to selectively couple the WUR frontend: to the RF interface via the impedance matching network, and to the baseband interface, wherein the WUR frontend and the receiver frontend share the impedance matching network.

2. The communication device according to claim 1, wherein the WUR frontend is configured to monitor a communication channel and control the receiver frontend to adjust its operating mode based on the monitoring of the communication channel.

3. The communication device according to claim 2, wherein adjusting the operating mode of the receiver fronted includes waking the receiver frontend from a sleep mode.

4. The communication device according to claim 1, wherein the WUR frontend has a lower power consumption than the receiver frontend.

5. The communication device according to claim 1, wherein the impedance matching network is selectively coupled to a biasing voltage based on an operating mode of the receiver frontend.

6. The communication device according to claim 1, wherein the WUR frontend is configured to share the RF interface with the receiver frontend.

7. The communication device according to claim 1, wherein the WUR frontend is selectively coupled to the receiver frontend between the RF interface and the baseband interface.

8. The communication device according to claim 1, wherein the receiver frontend further comprises an amplifier whose output is coupled to the baseband interface, the WUR frontend being coupled to the receiver frontend between the impedance matching network and the amplifier.

9. The communication device according to claim 1, further comprising a WUR switch that is configured to selectively couple the WUR frontend to the receiver frontend.

10. The communication device according to claim 1, further comprising a receiver shunt switch that is configured to selectively shunt the impedance matching network shared by the WUR frontend and the receiver frontend.

11. The communication device according to claim 1, further comprising:
    a WUR switch that is configured to selectively couple the WUR frontend to the receiver frontend; and
    a receiver shunt switch that is configured to selectively shunt the impedance matching network shared by the WUR frontend and the receiver frontend.

12. The communication device according to claim 11, wherein the WUR switch and the receiver shunt switch are selectively opened/closed based on an operating mode of the receiver frontend.

13. A communication device, comprising:
    a receiver frontend including a radio frequency (RF) interface, a baseband interface, and an impedance matching network; and
    a wake-up receiver (WUR) frontend selectively coupled to the receiver frontend, between the impedance matching network and the baseband interface, such that the WUR frontend and the receiver frontend are configured to share the impedance matching network.

14. The communication device according to claim 13, wherein the receiver frontend further comprises an amplifier whose input is coupled to the impedance matching network and the RF interface, and selectively coupled to the WUR frontend.

15. The communication device according to claim 13, wherein the WUR frontend is configured to monitor a communication channel and control the receiver frontend to wake from a sleep mode based on the monitoring of the communication channel.

16. The communication device according to claim 13, wherein the impedance matching network is selectively coupled to a biasing voltage based on an operating mode of the receiver frontend.

17. The communication device according to claim 13, wherein the WUR frontend is configured to share the RF interface with the receiver frontend.

18. The communication device according to claim 13, further comprising:
    a WUR switch that is configured to selectively couple the WUR frontend to the receiver frontend; and
    a receiver shunt switch that is configured to selectively shunt the impedance matching network shared by the WUR frontend and the receiver frontend.

19. The communication device according to claim 18, wherein the WUR switch and the receiver shunt switch are selectively opened/closed based on an operating mode of the receiver frontend.

20. A communication device, comprising:
    radio frequency (RF) interface and a baseband interface;
    an impedance matching network;
    a coupler configured to selectively couple a receiver frontend to the impedance matching network and the RF interface; and
    a wake-up receiver (WUR) frontend configured to:
        selectively couple to the RF interface and the impedance matching network, between the impedance matching network and the baseband interface, such that the WUR frontend and the receiver frontend share the impedance matching network;
        monitor a communication channel via the RF interface; and
        selectively couple the receiver frontend to the RF interface and the impedance matching network based on the monitoring of the communication channel.

21. The communication device according to claim 20, wherein the receiver frontend is configured to selectively enter a sleep mode when the receiver fronted is decoupled from the impedance matching network and the RF interface.

22. The communication device according to claim 20, wherein the impedance matching network is selectively coupled to a biasing voltage based on the selectively coupling of the receiver frontend and the WUR frontend to the impedance matching network.

23. The communication device according to claim 20, wherein the receiver frontend further comprises an amplifier whose input is coupled to the RF interface and the impedance matching network, wherein the WUR frontend is further coupled to the input of the amplifier when the WUR frontend is coupled to the RF interface and the impedance matching network.

24. The communication device according to claim 20, wherein, based on the selectively coupling of the receiver frontend and the WUR frontend to the impedance matching network an:
- the WUR frontend further comprises a WUR switch that is configured to selectively couple the WUR frontend to the RF interface and the impedance matching network; and
- the coupler further comprises a shunt switch that is configured to selectively shunt the impedance matching network.

\* \* \* \* \*